United States Patent
Watanuki et al.

(10) Patent No.: US 8,761,567 B2
(45) Date of Patent: Jun. 24, 2014

(54) MOVING IMAGE REPRODUCER REPRODUCING MOVING IMAGE IN SYNCHRONIZATION WITH MUSICAL PIECE

(75) Inventors: Masatoshi Watanuki, Sagamihara (JP); Tetsuji Makino, Hamura (JP); Masaaki Sasaki, Hachioji (JP); Hyuta Tanaka, Fussa (JP); Michihiro Nihei, Mitaka (JP); Katsunori Ishii, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 34 days.

(21) Appl. No.: 13/486,339

(22) Filed: Jun. 1, 2012

(65) Prior Publication Data
US 2012/0307146 A1    Dec. 6, 2012

(30) Foreign Application Priority Data
Jun. 3, 2011   (JP) ................... 2011-125633

(51) Int. Cl.
*H04N 5/783*     (2006.01)

(52) U.S. Cl.
USPC ........................... 386/201; 348/512; 386/343

(58) Field of Classification Search
USPC .......... 386/200, 201, 343, 353; 348/512, 515; 345/475
See application file for complete search history.

(56) References Cited

U.S. PATENT DOCUMENTS

| | | | |
|---|---|---|---|
| 6,462,741 B1 * | 10/2002 | Nishihata ..................... | 345/473 |
| 6,898,759 B1 * | 5/2005 | Terada et al. ................. | 715/202 |
| 7,725,828 B1 * | 5/2010 | Johnson ....................... | 715/726 |
| 2011/0206354 A1 * | 8/2011 | Omura ......................... | 386/343 |
| 2012/0237186 A1 * | 9/2012 | Makino et al. ................ | 386/282 |

FOREIGN PATENT DOCUMENTS

| | | | |
|---|---|---|---|
| JP | 05-181460 A | | 7/1993 |
| JP | 10-307930 | * | 11/1998 |
| JP | 2008176679 A | * | 7/2008 |

OTHER PUBLICATIONS

Komatsu et al, machine generated translation of JP2008176679, Jul. 2008.*

* cited by examiner

*Primary Examiner* — David Harvey
(74) *Attorney, Agent, or Firm* — Holtz Holtz Goodman & Chick PC (57) ABSTRACT

A moving image reproducer includes a generation section, a calculation section, a determination section, a correction section and a control section. The generation section generates an interpolation frame image interpolating between two adjacent frame images among a plurality of frame images. The calculation section sequentially calculates a progress level of a predetermined musical piece between the two adjacent frame images reproduced in synchronization with the predetermined musical piece. The determination section determines whether the progress level has varied along with a change in a tempo of the predetermined musical piece defined in the tempo information. The correction section corrects the progress level so as to reduce the variation in the progress level along with the change in the tempo if the progress level is determined to have varied. The control section controls the generation section to generate an interpolation frame image corresponding to the corrected progress level.

6 Claims, 7 Drawing Sheets

MOVING IMAGE REPRODUCER REPRODUCING MOVING IMAGE IN SYNCHRONIZATION WITH MUSICAL PIECE

BACKGROUND OF THE INVENTION

1. Field of the Invention

The present invention relates to a reproducer, a method, a recording medium of reproducing a moving image in synchronization with a musical piece.

2. Description of Related Art

A technique is known that reproduces a plurality of frame images in a switchable manner in association with a beat or a bar of an automatically played musical piece (for example, see Japanese Unexamined Patent Application Publication No. H5-181460).

However, in such a technique, the display time of each frame image varies depending on a variation in time of one beat or one bar, and thus a moving subject in frame images may not be comfortably and smoothly expressed.

Another technique is known that reproduces an image between two adjacent images in an interpolative manner among a plurality of frame images defining a moving image. However, in such a reproduction technique, if the tempo of a musical piece varies within one bar, the progress level of the musical piece may vary in the bar, resulting in a discrepancy in displayed contents of the interpolation frame image.

SUMMARY OF THE INVENTION

The present invention has been made in the light of such a problem, and provides a moving image reproducer that can reproduce an appropriate interpolation frame image in consideration of the progress level of a musical piece, a method of reproducing a moving image with the moving image reproducer, and a recording medium.

To solve at least one of the above-mentioned problems, according to a first aspect of the present invention, there is provided a moving image reproducer that includes a generation section which generates an interpolation frame image interpolating between two adjacent frame images among a plurality of frame images stored in a predetermined storage section, a calculation section which sequentially calculates a progress level of a predetermined musical piece, which is provided with tempo information, between the two adjacent frame images among the plurality of frame images reproduced in synchronization with the predetermined musical piece, a determination section which determines whether the progress level has varied along with a change in a tempo of the predetermined musical piece defined in the tempo information, a correction section which corrects a the progress level so as to reduce the variation in the progress level along with the change in the tempo if the progress level is determined to have varied, and a control section which controls the generation section to generate an interpolation frame image corresponding to the progress level corrected by the correction section.

According to a second aspect of the present invention, there is provided a method of reproducing a moving image with a moving image reproducer. The method includes a step of generating an interpolation frame image interpolating between two adjacent frame images among a plurality of frame images stored in a predetermined storage section, a step of sequentially calculating a progress level of a predetermined musical piece, which is provided with tempo information, between the two adjacent frame images among the plurality of frame images reproduced in synchronization with the predetermined musical piece, a step of determining whether the progress level has varied along with a change in the tempo, a step of correcting the progress level so as to reduce the variation in the progress level along with the change in the tempo when the progress level is determined to have varied, and a step of controlling an operation in the frame-image generation step to generate an interpolation frame image corresponding to the corrected progress level.

According to a third aspect of the present invention, there is provided a recording medium storing a computer-readable program that causes the computer to function as a generation section which generates an interpolation frame image interpolating between two adjacent frame images among a plurality of frame images stored in a predetermined storage section, a calculation section that sequentially calculates a progress level of playing of a predetermined musical piece, which is provided with tempo information, between the two adjacent frame images among the plurality of frame images reproduced in synchronization with the predetermined musical piece, a determination section which determines whether the progress level has varied along with a change in the tempo, a correction section which corrects the progress level so as to reduce the variation in the progress level along with the change in the tempo when the progress level is determined to have varied, and a control section which controls the generation function to generate an interpolation frame image corresponding to the progress level corrected by the correction function.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

A description will be given below in detail with reference to the drawings. However, the scope of the invention is not limited to the following examples shown in the drawings.

Figure 1:
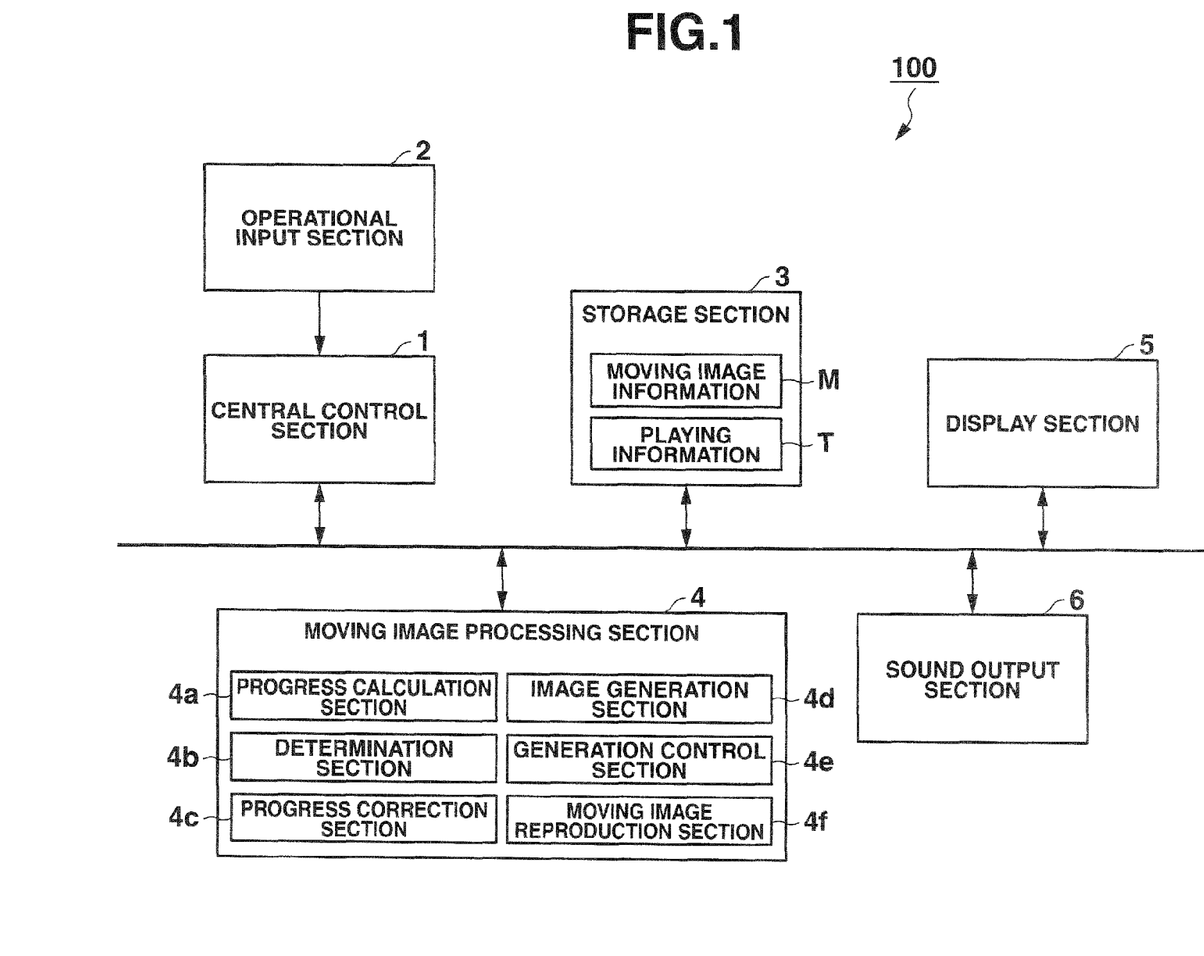
FIG. 1 is a block diagram illustrating a schematic configuration of a moving image reproducer of an embodiment of the present invention.

FIG. 1 is a block diagram illustrating a schematic configuration of a moving image reproducer 100 of an embodiment of the present invention.

The moving image reproducer 100 of the embodiment sequentially calculates the progress level of a predetermined musical piece between two adjacent frame images among a plurality of frame images reproduced in synchronization with the musical piece. If the moving image reproducer 100 determines that the progress level of the musical piece corresponding to a reproduction timing of an interpolation frame image varies along with a change in the tempo of the musical piece, the moving image reproducer 100 corrects the progress level of the musical piece so as to reduce the variation in the progress level along with the change in the tempo and generates an interpolation frame image corresponding to the corrected progress level.

The moving image reproducer 100 includes, for example, a personal computer, and, as shown in FIG. 1, includes a central control section 1, an operational input section 2, a storage section 3, an moving image processing section 4, a display section 5, and a sound output section 6.

The central control section 1 controls each component of the moving image reproducer 100. In detail, the central control section 1 includes a CPU, a RAM, and a ROM, each being not shown, and performs various control operations in accordance with various processing programs (not shown) stored in the ROM. In such operations, the CPU stores various processed results in a memory area of the RAM, and displays the processed results on the display section 5 as necessary.

The RAM includes, for example, a program memory area for expanding each processing program to be executed by the CPU and a data memory area storing input data and processed results generated during execution of the processing programs.

The ROM stores programs written in the form of computer-readable program codes. In detail, the ROM stores system programs executable by the moving image reproducer 100, various processing programs executable by the system programs, and data used during execution of the processing programs.

The operational input section 2 includes, for example, a keyboard and a mouse, the keyboard including data input keys for input of numerical values, characters, and the like, vertical and horizontal shift keys for data selection, feeding operations, and the like, various functional keys, and the like. In addition, the operational input section 2 sends depression signals of a key depressed by a user and operational signals of the mouse to the CPU.

A touch panel (not shown) may be provided as the operational input section 2 located on a screen of the display section 5 to allow input of various instructions depending on touched positions on the touch panel.

The storage section 3 is composed of, for example, a semiconductor nonvolatile memory or a hard disc drive (HDD), and stores moving image information M, playing information T and other information.

The moving image information M is automatically reproduced together with the playing information T by a moving image reproduction section 4f. Specifically, the moving image information M includes a plurality of frame images, to be reproduced at a predetermined interval, arranged successively along a temporal axis.

The successively arranged frame images are created with subject-clipped images including regions having a subject, the regions being clipped from subject-included images by, for example, a known subject clipping process. Specifically, an image generator (not shown) defines a subject-clipped image being a still image as a reference, and sets a plurality of motion control points in the subject images in a region including the subject of the subject-clipped image with the reference. The image generator then moves all or at least one of the control points within a predetermined space, and moves or deforms a predetermined image region (for example, a triangular or rectangular region) set in the subject image with reference to the moved control point, and thus sequentially generates frame images. The image generator then arranges the generated frame images along a temporal axis to generate the moving image information M.

The process of moving or deforming a predetermined image region with reference to a control point is generally known, thus detailed description of the process is omitted.

Figure 5A:
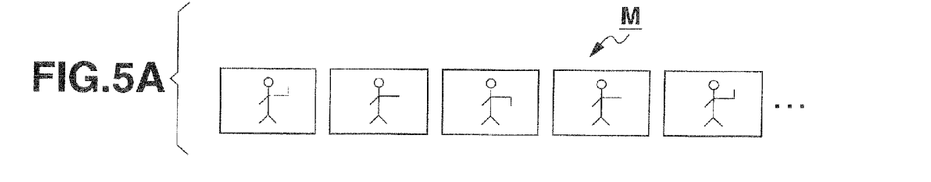
FIGS. 5A to 5C are schematic illustrations of the moving image reproduction process shown in FIG. 4.

For example, as shown in FIG. 5A, the moving image information M includes a plurality of (for example, n (natural number)) reference frame images (for example, reference frame images F1, ..., Fk, Fk+1, ..., Fn (k is a natural number smaller than n)) schematically showing a motion of bending a wrist of a person.

The moving image information M shown in FIG. 5A is illustrative only, and the contents of the motion may be appropriately modified or altered.

The storage section 3 stores the plurality of reference frame images F1, ..., Fk, Fk+1, ..., Fn configuring an moving image.

The playing information T is used for automatically reproducing a musical piece together with the moving image information M by the moving image reproduction section 4f. The playing information T includes, for example, information defining tempi, meters (musical meters) and the like, and several pieces of information defining the musical piece. These pieces of information are stored in association with a title of the musical piece.

The playing information T is digital data defined according to, for example, the musical instruments digital interface (MIDI) standard. In detail, the playing information T includes header information defining the format of the relevant MIDI file, the number of tracks, the resolution of a quarter note (Tick count), and the like; and track information including events and timings referred for reproducing sound sources (for example, musical instruments) assigned to the respective parts. The events include information instructing a change in the tempo or the meter, NoteOn, NoteOff, and the like.

The moving image processing section 4 includes a progress calculation section 4a, a determination section 4b, a progress correction section 4c, an image generation section 4d, a generation control section 4e, and the moving image reproduction section 4f.

The progress calculation section 4a sequentially calculates the progress level of a predetermined musical piece reproduced between two adjacent reference frame images Fk and Fk+1.

Specifically, the progress calculation section 4a sequentially calculates the progress level of the musical piece, which is reproduced on the basis of the playing information T by the moving image reproduction section 4f, between the two adjacent reference frame images Fk and Fk+1 reproduced in synchronization with a predetermined timing, for example, a first beat of each bar of the musical piece. In detail, the progress calculation section 4a analyzes the header information and the track information of the playing information T according to the MIDI standard through a preliminary analytical process (described below) to acquire tempo-setting information and the resolution (Tick count) of a quarter note. In addition, the progress calculation section 4a converts an elapsed time of the predetermined musical piece to a Tick count on the basis of a change in the tempo setting and the resolution (Tick count) of a quarter note. The progress calculation section 4a then calculates the progress level of the predetermined musical piece between the two adjacent reference images Fk and Fk+1, for example, in percentage, on the basis of the Tick count corresponding to the elapsed time of the predetermined musical piece.

The determination section 4b determines whether the progress level of the musical piece, which corresponds to the reproduction timing of a frame image interpolating between two adjacent reference frame images Fk and Fk+1 (interpolation frame image I), varies along with a change in the tempo.

In detail, the determination section 4b determines whether reading of the event of a tempo change from the track information or new external setting of a tempo change is detected. After such tempo change is detected, the progress level of the musical piece, which is newly calculated at a predetermined timing just after the detection of tempo change, is compared with the previous progress level, which has been calculated at the previous timing just before the detection of tempo change. The comparison shows that the newly calculated progress level greatly varies compared with the previous progress level.

Figure 5B:
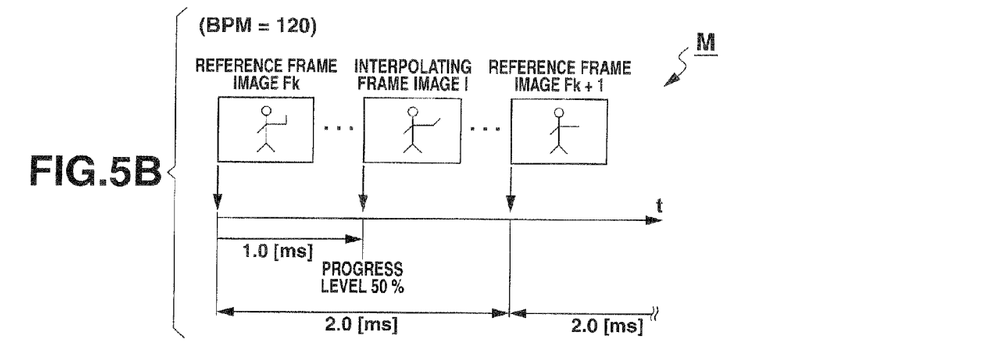
Figure 5C:
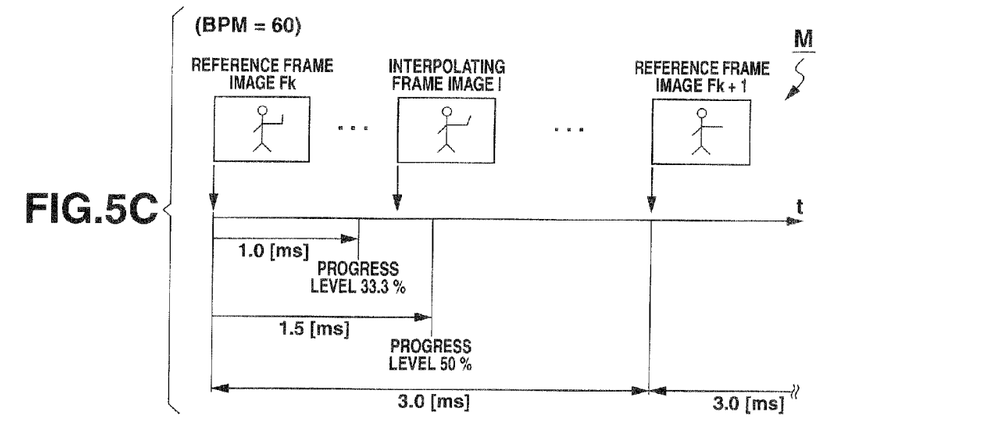

FIGS. 5B and 5C illustrates a case where the tempo slows down during the reproduction of a predetermined musical piece.

Specifically, if the tempo (playing speed) of the musical piece varies at a reproduction timing of one interpolation frame image I (i.e., between two adjacent reference frame images Fk and Fk+1 (for example, a first beat of each bar)), the newly calculated progress level may be lower than the previous progress level calculated before the tempo change (see, FIGS. 5B and 5C).

For example, assuming a tempo is at 120 BPM a reproducing time of one bar equals to two seconds, thus the reference frame images Fk and Fk+1 are synchronized at an interval of two seconds. After a lapse of one second from a synchronized point of the reference frame image Fk, the progress level of the musical piece is 50%, leading to display a first interpolation frame image I as a substantially middle image of the reference frame images Fk and Fk+1 weighted by 50% each (see FIG. 5B).

If the tempo changes from 120 BPM to 60 BPM immediately after a lapse of one second, the remaining time before the synchronization point of the reference frame image Fk+1 increases to two times (approximately two seconds) after the timing of the tempo change, and thus the progress level of the musical piece is substantially 33.3% from the synchronization point of the reference frame image Fk (see FIG. 5C). As a result, within a period from the timing of tempo change to a progress level of the musical piece of substantially 50%, the progress levels of the musical piece, which are calculated after the tempo change, are less than the previous progress level calculated just before the tempo change (i.e., 50%). Within such period, the determination section 4b determines a substantial decrease in the progress level of the musical piece.

In such a case, as shown in FIG. 5C, the image generating section 4d generates a second interpolation frame image I, in which the reference frame image Fk is much weighted compared with the first interpolation frame image I (see FIG. 5B). Then the display section 5 displays the second interpolation frame image I.

The progress correction section 4c corrects the progress level of the musical piece so as to reduce the variation in the progress level, and thus creates a corrected progress level.

Specifically, if the determination section 4b determines that the progress level at the reproduction timing of the interpolation frame image I decreases along with the tempo change, the progress correction section 4c corrects the progress level so as to reduce the decrease in the progress level. In detail, the progress correction section 4c corrects the progress level on the basis of the previously calculated progress level (for example, 50% in FIG. 5B) referred in the comparative determination by the determination section 4b, and creates the corrected progress level.

For example, the progress correction section 4c averages the newly calculated progress level after the tempo change and the previous progress level before the tempo change into a corrected progress level of the musical piece.

In other words, the progress correction section 4c corrects the progress level in such away that the progress level is an average between the progress level calculated before the change of the tempo and the progress level calculated after the change of the tempo.

The method of correcting the progress level of the musical piece is not limited to the method of averaging the newly calculated progress level of the musical piece and the previous progress level of the musical piece, and may include weighted averaging where the previous progress level is more weighted, for example.

The case where the tempo of the musical piece slows down halfway has been described above. If the tempo of the musical piece speeds up halfway, the progress correction section 4c corrects the progress level so as to reduce the progress level on the basis of the previously calculated progress level of the musical piece, and generates a corrected progress level of the musical piece. In such a case, the progress correction section 4c may also average the newly calculated progress level of the musical piece and the previous progress level of the musical piece into a corrected progress level of the musical piece.

The image generation section 4d generates, as a generation section, an interpolation frame image I interpolating between two adjacent reference frame images Fk and Fk+1 among a plurality of frame images F1 to Fn.

Specifically, the image generation section 4d differently weights the two adjacent reference frame images Fk and Fk+1 depending on the progress level of a predetermined musical piece between the two adjacent reference frame images Fk and Fk+1, and thus generates the interpolation frame image I. In detail, the image generation section 4d is driven under the control of the generation control section 4e, and generates the interpolation frame image I through differently weighting the two adjacent reference frame images Fk and Fk+1 depending on the progress level (for example, in percentage) of the musical piece calculated by the progress calculation section 4a or on the progress level corrected by the progress correction section 4c.

The process of generating the interpolation frame image I is generally known; hence, detailed description of the process is omitted.

The generation control section 4e controls the image generation section 4d to generate the interpolation frame images I.

Specifically, if a tempo change has been not detected, i.e., the progress level of the musical piece has been not corrected, the generation control section 4e controls the image generation section 4d to generate the interpolation frame image I depending on the progress level calculated by the progress calculation section 4a. And if the progress correction section 4c corrects the progress level of the musical piece, the generation control section 4e controls the image generation section 4d to generate the interpolation frame image I depending on the corrected progress level. In detail, the generation control section 4e controls the image generation section 4d to generate the interpolation frame image I through differently weighting the two adjacent reference frame images Fk and Fk+1 depending on the corrected progress level of the musical piece.

The moving image reproduction section 4f automatically reproduces a predetermined musical piece on the basis of the playing information T, and reproduces each of the plurality of frame images at the predetermined timing of the predetermined musical piece.

In detail, the moving image reproduction section 4f reads the digital data of the playing information T of the predetermined musical piece, and converts the digital data to analog data by a D/A converter for automatic reproduction of the predetermined musical piece. In this operation, the moving image reproduction section 4f reproduces the two adjacent reference frame images Fk and Fk+1 in synchronization with the predetermined timing (for example, a first beat of each bar or each beat), and reproduces each interpolation frame image I generated by the image generation section 4d depending on the progress level of the predetermined musical piece between the two adjacent reference frame images Fk and Fk+1.

The display section 5 includes, for example, a display such as a liquid crystal display (LCD) and a cathode ray tube (CRT), and displays various types of information on a screen under the control of the CPU of the central control section 1.

Specifically, the display section 5 displays the plurality of frame images on the screen during reproduction of the moving image information M by the moving image reproduction section 4f. In detail, the display section 5 displays the reference frame images F1 to Fn and the interpolation frame images I at a predetermined or corrected timing of the automatically played musical piece in a switchable manner at a predetermined or corrected time interval.

The sound output section 6 includes, for example, a low pass filter (LPF), an amplifier, and a speaker, and outputs sounds under control of the CPU of the central control section 1.

Specifically, the sound output section 6 outputs sounds of a musical piece at a predetermined tone, pitch, and length from the speaker through the amplifier on the basis of analog data provided by the D/A converter during the reproduction of the playing information T by the moving image reproduction section 4f. The sound output section 6 may output sounds from one sound source (for example, a musical instrument), or may simultaneously output sounds from a plurality of sound sources.

The preliminary analytical process is now described with reference to FIG. 2.

Figure 2:
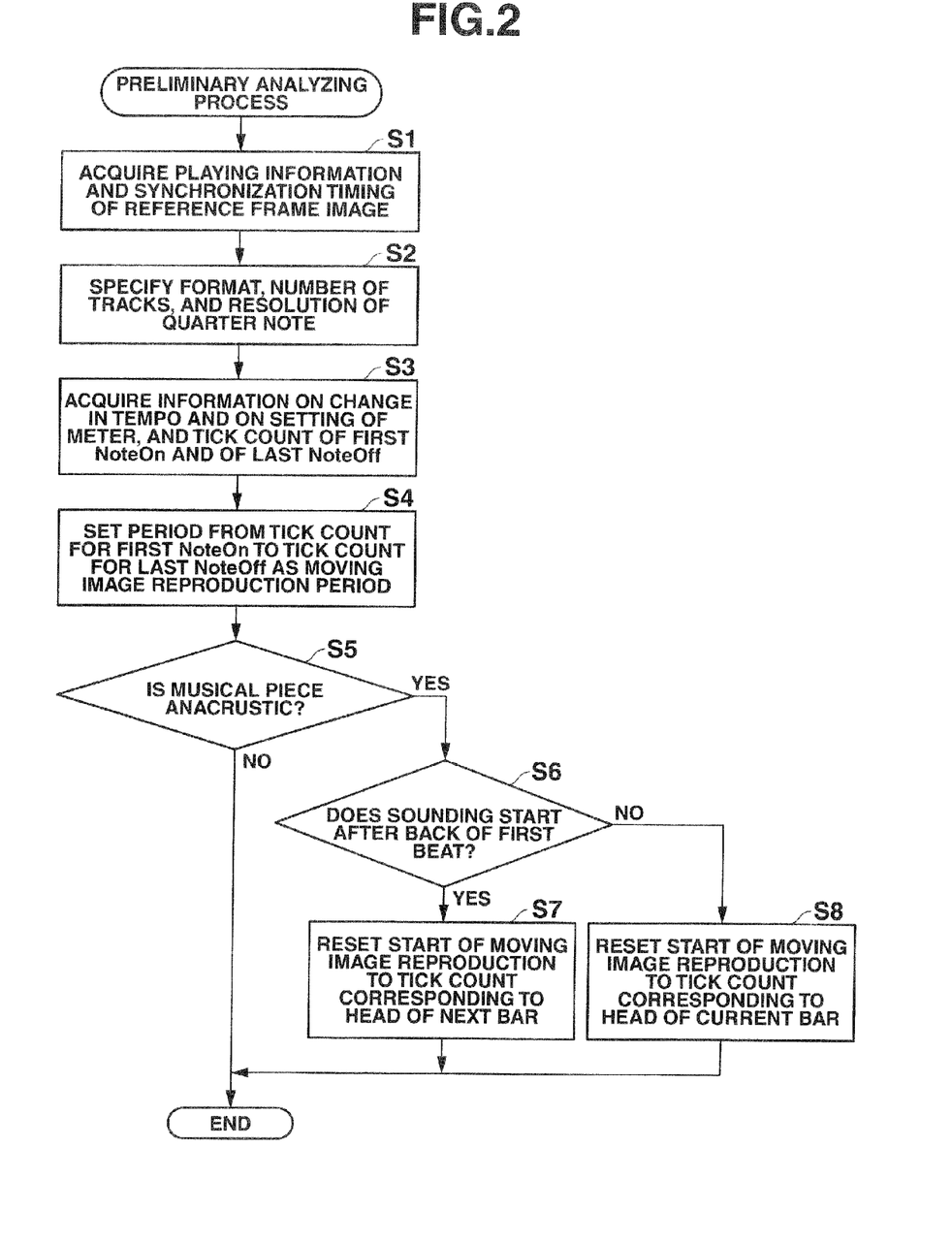
FIG. 2 is a flowchart illustrating an exemplary operation according to a preliminary analytical process with the moving image reproducer shown in FIG. 1.

FIG. 2 is a flowchart illustrating an exemplary operation according to the preliminary analytical process.

As shown in FIG. 2, the moving image processing section 4 reads and acquires a piece of playing information T, which a user specifies among the plurality of pieces of playing information T stored in the storage section 3 through a predetermined operation of the operational input section 2. The moving image processing section 4 also acquires a synchronization timing (for example, the beginning of each bar) of a reference frame image Fk, which the user specifies through a predetermined operation of the operational input section 2 (step S1).

The progress calculation section 4a then analyzes the header information in the acquired playing information T according to the MIDI standard to specify the format of the MIDI file, the number of tracks, and the resolution of a quarter note, namely, a Tick count (for example, Tick=480) (step S2).

The progress calculation section 4a then analyzes the track information in the playing information T to acquire the information on the timing of the tempo change, and acquire the Tick count defining the timing of each of the first NoteOn and the last NoteOff among all the tracks (step S3). The progress calculation section 4a then sets the period from a Tick count for the first NoteOn to a Tick count for the last NoteOff as a moving image reproduction period (step S4).

The progress calculation section 4a then determines whether the musical piece to be automatically reproduced is an anacrustic musical piece (that is, the sounding of the musical piece starts at other than the beginning of the first beat on the basis of the resolution of a quarter note), the set (i.e., change) timing of the meter, and the moving image reproduction period (step S5).

If the musical piece is anacrustic (step S5; YES), the moving image processing section 4 determines whether the sounding starts after the back of the first beat of the first bar on the basis of the Tick count defining the timing of the first NoteOn (step S6).

If the progress calculation section 4a determines that the sounding starts after the back of the first beat of the first bar (step S6; YES), the progress calculation section 4a resets the start of the moving image reproduction period to correspond to the Tick count of the head of the next bar (end of the current bar) (step S7).

In contrast, if the progress calculation section 4a determines that the sounding does not start after the back of the first beat of the first bar (step S6; NO), the progress calculation section 4a resets the start of the moving image reproduction period to correspond to the Tick count of the head of the current bar (step S8).

This is the end of the preliminary analytical process.

The moving image reproduction process is now described with reference to FIGS. 3 and 4.

Figure 3:
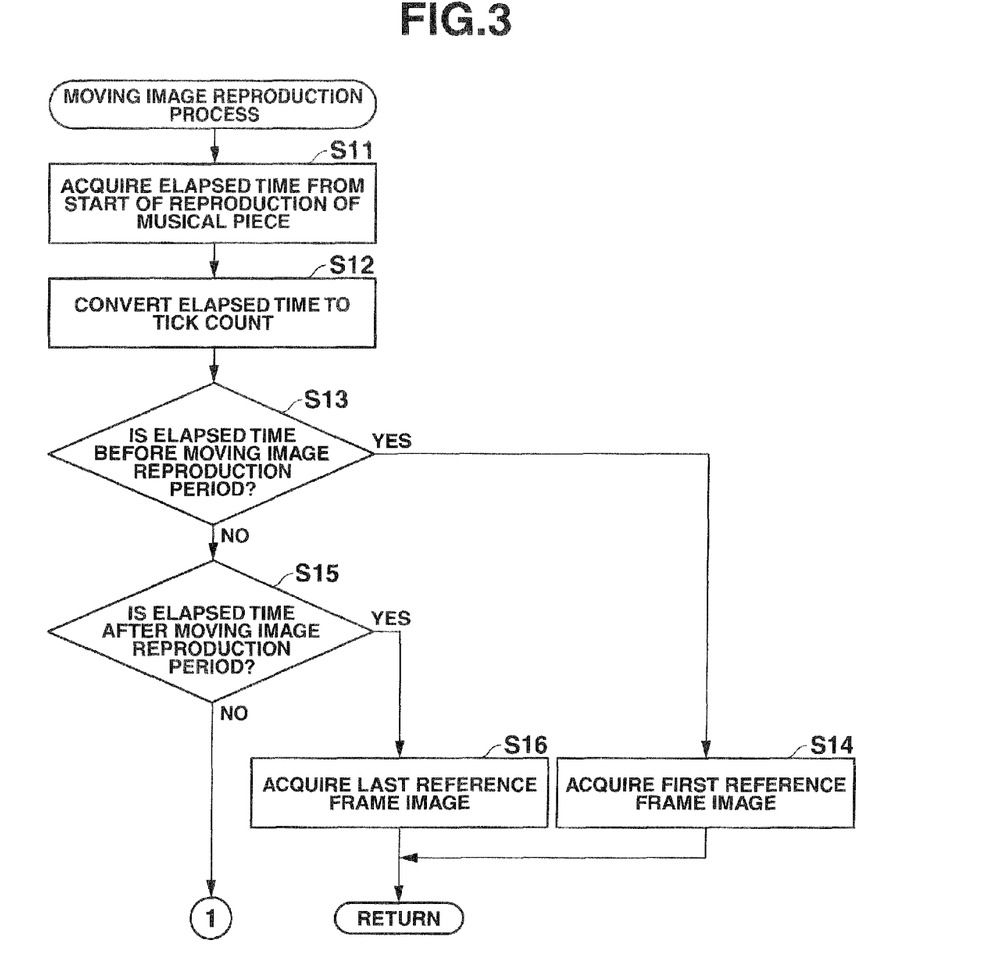
FIG. 3 is a flowchart illustrating an exemplary operation according to a moving image reproduction process with the moving image reproducer shown in FIG. 1.
Figure 4:
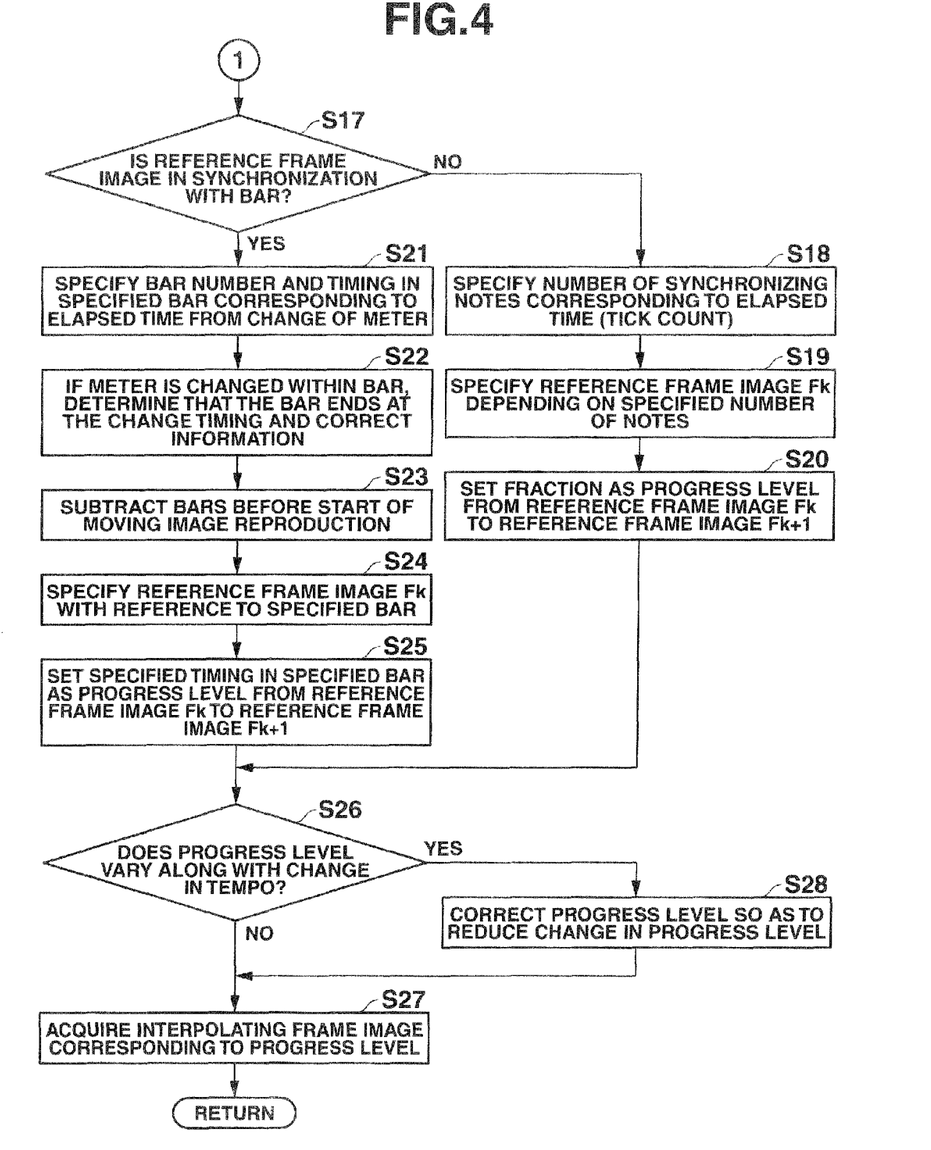
FIG. 4 is a flowchart illustrating a process following the moving image reproduction process shown in FIG. 3.

FIGS. 3 and 4 are flowcharts illustrating an exemplary operation according to the moving image reproduction process.

The moving image reproduction process is sequentially executed at every predetermined interval (for example, 30 ms) during reproduction of the moving image, upon user's instruction on the start of moving image reproduction by the moving image reproduction section 4f through a predetermined operation of the operational section 2.

As shown in FIG. 3, the progress calculation section 4a acquires the elapsed time (ms) from the start of the reproduction of the musical piece from a timer (not shown) (step S11), and then converts the elapsed time to a Tick count on the basis of the change in setting of the tempo and the resolution (Tick count) of a quarter note (step S12).

The progress calculation section 4a then determines whether the elapsed time is before the start of the moving image reproduction period on the basis of the Tick count of the elapsed time (step S13).

If the progress calculation section 4a determines that the elapsed time is before the start of the moving image reproduction period (step S13; YES), the moving image reproduction section 4f acquires the first reference frame image F1 among the plurality of reference frame images F1 to Fn (step S14).

As a result, the moving image reproduction section 4f automatically reproduces the predetermined musical piece on the basis of the playing information T, and when the sound output section 6 outputs the first sound of the musical piece, the first reference frame image F1 is being displayed on the screen of the display section 5.

In contrast, if the progress calculation section 4a determines that the elapsed time is not before the start of the moving image reproduction period (step S13; NO), the progress calculation section 4a determines whether the elapsed time is after the end of the moving image reproduction period on the basis of the Tick count of the elapsed time (step S15).

If the progress calculation section 4a determines that the elapsed time is after the end of the moving image reproduction period (step S15; YES), the moving image reproduction section 4f acquires the last reference frame image Fn among the plurality of reference frame images F1 to Fn (step S16).

As a result, the moving image reproduction section 4f automatically reproduces the predetermined musical piece on the basis of the playing information T, and after the last NoteOff, the display section 5 displays the last reference frame image Fn on the screen.

In contrast, if the progress calculation section 4a determines that the elapsed time is not after the end of the moving image reproduction period (step S15; NO), as shown in FIG. 4, the progress calculation section 4a then determines whether the reference frame image Fk is to be displayed in synchronization with a bar (step S17).

If the progress calculation section 4a determines that the reference frame image Fk is not to be displayed in synchronization with a bar (step S17; NO), the progress calculation section 4a specifies the number of synchronizing notes (for example, quarter notes) corresponding to the elapsed time on the basis of the Tick count of the elapsed time (step S18). In detail, the progress calculation section 4a specifies the corresponding number of the notes through dividing the Tick count of the elapsed time by the Tick count of the synchronizing note. If the Tick count is indivisible, the indivisible odd sum may be expressed by a fraction or a decimal.

The progress calculation section 4a then specifies the reference frame image Fk among the plurality of reference frame images F1 to Fn depending on the specified number of the notes (the integer part) on the basis of the result of the specification of the corresponding number of the synchronizing notes (step S19). The progress calculation section 4a then expresses the indivisible odd sum (for example, ⅓) in percentage on the basis of the result of the specification of the corresponding number of the synchronizing notes. The progress calculation section 4a then sets the above expressed value as the progress level of the musical piece between the two adjacent reference frame images Fk and Fk+1 (step S20).

In contrast, if the progress calculation section 4a determines that the reference frame image Fk is to be displayed in synchronization with a bar (step S17; YES), the progress calculation section 4a specifies bar number and the timing within the specified bar corresponding to the elapsed time on the basis of the Tick count of the elapsed time and the change in setting of the meter (step S21). If a meter is changed within one bar, the progress calculation section 4a determines that the bar ends at the timing of changing the meter, and corrects the information associated with the specified bar number and the specified timing within the specified bar corresponding to the elapsed time determined in step S21 (step S22). The process of correcting the information associated with the specified bar number and the specified timing within the specified bar corresponding to the elapsed time is not always necessary.

The progress calculation section 4a then subtracts the bars before the start timing of moving image reproduction in order to exclude a period from start of reproduction to output of the sounds of the musical piece from the sound output section 6, and thus corrects the information associated with the specified bar number and the specified timing within the specified bar corresponding to the elapsed time (step S23).

The progress calculation section 4a then specifies the reference frame image Fk among the plurality of reference frame images F1 to Fn with reference to the specified bar number (step S24). The progress calculation section 4a then expresses the specified timing within the specified bar in percentage, and sets the expressed value as the progress level of the predetermined musical piece between the two adjacent reference frame images Fk and Fk+1 (step S25).

The determination section 4b then determines whether the newly calculated progress level of the musical piece varies along with the change in the tempo with respect to the previous progress level of the musical piece (step S26).

This determination process is sequentially executed at every calculation of the progress level by the progress calculation section 4a, namely, at every setting of the progress level in step S20 or S25.

If the determination section 4b determines that the newly calculated progress level of the musical piece does not vary with respect to the previous progress level of the musical piece in step S26 (step S26; NO), the image generation section 4d generates an interpolation frame image I through differently weighting the two adjacent reference frame images Fk and Fk+1 depending on the newly calculated progress level of the musical piece by the progress calculation section 4a (step S27).

As a result, the moving image reproduction section 4f automatically reproduces the predetermined musical piece on the basis of the playing information T, and the display section 5 displays the interpolation frame image I corresponding to the progress level of the predetermined musical piece on the screen, while the sound output section 6 outputs sounds of the musical piece.

In contrast, if the determination section 4b determines that the newly calculated progress level of the musical piece varies along with the change of the tempo in step S26 (step S26; YES), the progress correction section 4c corrects the progress level so as to reduce the variation in the progress level on the basis of the previously calculated progress level according to the comparative determination by the determination section 4b, and generates the corrected progress level (step S28). In detail, for example, the progress correction section 4c averages the newly calculated progress level and the previous progress level into the corrected progress level.

The moving image processing section 4 then shifts the process to step S27, and the image generation section 4d generates an interpolation frame image I through differently weighting the two adjacent reference frame images Fk and Fk+1 depending on the progress level of the musical piece corrected by the progress correction section 4c (step S27).

As a result, the moving image reproduction section 4f automatically reproduces the predetermined musical piece on the basis of the playing information T, and the display section 5 displays the interpolation frame image I, which is generated in consideration of the progress level of the predetermined musical piece, on the screen, while the sound output section 6 output sounds of the musical piece.

As described above, in the embodiment, the moving image reproducer 100 sequentially calculates the progress level of the predetermined musical piece between the two adjacent reference frame images Fk and Fk+1 reproduced in synchronization with the predetermined timing of the musical piece. If the moving image reproducer 100 determines that the progress level of the predetermined musical piece corresponding to the reproduction timing of the interpolation frame image I varies along with the change in the tempo of the musical piece, the moving image reproducer 100 corrects the progress level of the musical piece so as to reduce the variation in the progress level of the musical piece and thus generates the corrected progress level of the musical piece. Furthermore, the moving image reproducer 100 generates the interpolation frame image I depending on the corrected progress level of the musical piece; hence, the moving image reproducer 100 can reproduce a more appropriate interpolation frame image I in consideration of the progress level of the automatically played musical piece.

Specifically, even if the playing speed (tempo) of the musical piece varies within one bar being automatically reproduced, and even if the progress level of the musical piece may vary within the bar, the moving image reproducer 100 corrects the progress level of the musical piece so as to reduce the variation in the progress level of the musical piece. In addition, the moving image reproducer 100 generates the interpolation frame image I depending on the corrected progress level of the musical piece, and thus can reduce the discrepancies between the contents of the interpolation frame image I and the substantial progress level of the musical piece. This results in reproduction of an appropriate interpolation frame image I that can reduce the discomfort caused by motion of a subject.

Note that the embodiments above are merely the examples thus are not intended as a definition of the limits of the present invention. It is also possible to appropriately modify detailed configurations and operations of the respective units configuring the apparatus within the scope without departing from the spirit of the invention.

A modification of the moving image reproducer 100 is now described.

Modification 1

Figure 6:
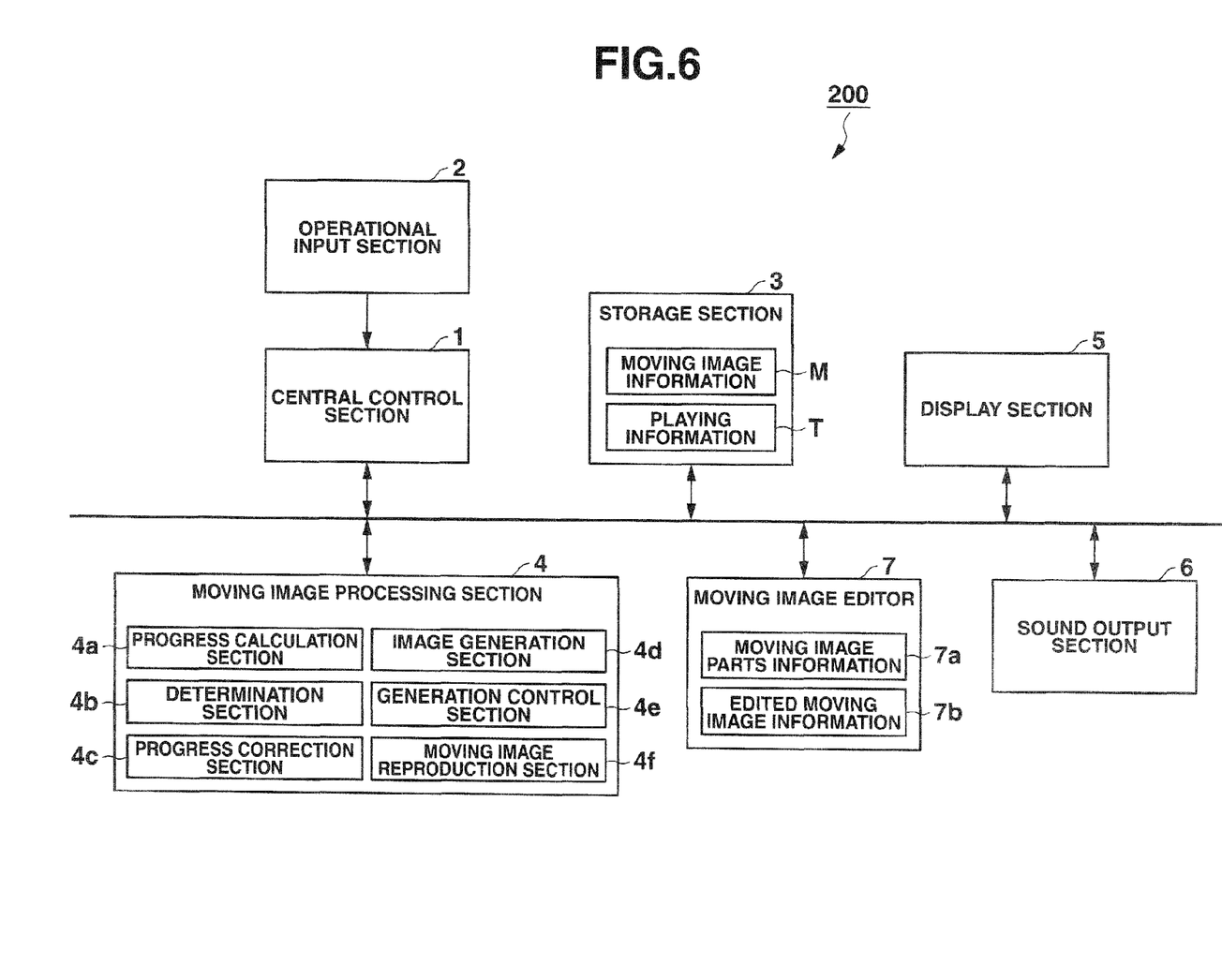
FIG. 6 is a block diagram illustrating a schematic configuration of a moving image reproducer of Modification 1.

FIG. 6 is a block diagram illustrating a schematic configuration of a moving image reproducer 200 of Modification 1.

Figure 7:
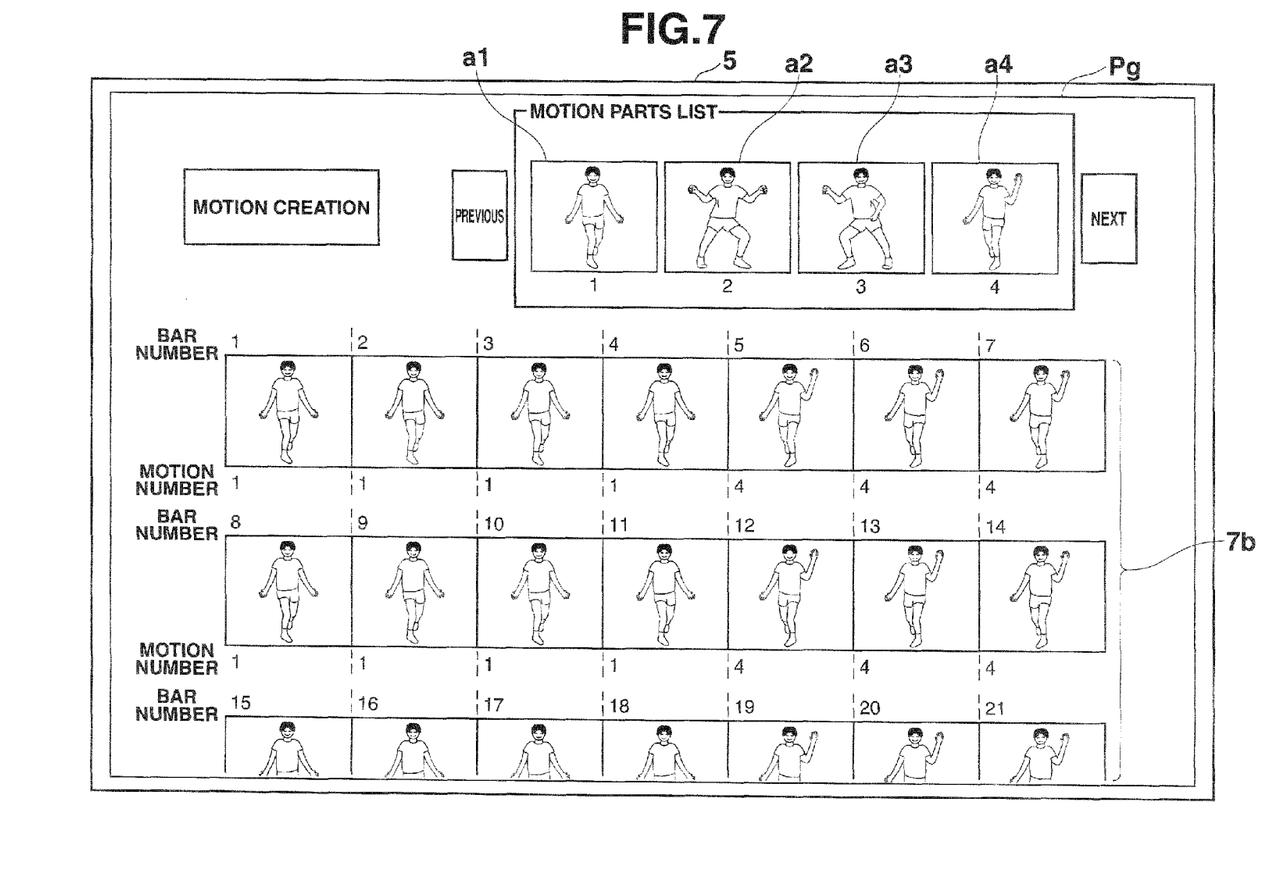
FIG. 7 is a schematic illustration of an editing process with the moving image reproducer shown in FIG. 6.

FIG. 7 is a schematic illustration of an editing process with the moving image reproducer 200 of Modification 1.

As shown in FIG. 6, the moving image reproducer 200 of Modification 1 includes a moving image editing section 7 in addition to a central control section 1, an operational input section 2, a storage section 3, an moving image processing section 4, a display section 5, and a sound output section 6.

Modification 1 has substantially the same configuration as that in the above-described embodiment except for the point described in detail below, and duplicated description is omitted.

The moving image editing section 7 appropriately combines several pieces of moving image part information 7a with a predetermined length as a base unit to create desired, edited moving image information 7b.

Specifically, the moving image editing section 7 stores, for example, the moving image part information 7a with the base unit including a bar or a note such as a quarter note. The moving image part information 7a is composed of at least one of the reference frame images Fk and Fk+1 and the interpolation frame image I, the plurality of frame images being arranged along a time axis.

The moving image editing section 7 appropriately combines a predetermined number of pieces of the moving image part information 7a, which are shown by symbols a1 to a4 in FIG. 7, specified through a predetermined operation of the operational input section 2 by a user within an moving image editing screen Pg (see FIG. 7) appearing on the display section 5, and thus generates and stores the edited moving image information 7b in which the predetermined number of pieces of moving image part information 7a are arranged along a temporal axis.

Hence, according to the moving image reproducer 200 of Modification 1, the plurality of pieces of moving image part information 7a are preliminarily stored, thereby the user-desired edited moving image information 7b can be readily generated through appropriate combination of the pieces of moving image part information 7a.

The generated, edited moving image information 7b may be used for the moving image reproduction process in the embodiment. Specifically, the moving image reproduction section 4f may reproduce each of the plurality of frame images defining the edited moving image information 7b at the predetermined timing of the predetermined musical piece, while automatically plays the predetermined musical piece on the basis of the playing information T.

Although the personal computer has been exemplified as the moving image reproducer 100 in the embodiment, this is illustrative only and various modifications or alterations can be appropriately made. For example, a mobile phone may be used instead.

Furthermore, the moving image reproducer 100 may have a function as a Web server so that the Web server (moving image reproducer 100) generates the image data of the plurality of frame images and the playing information T as one file on the basis of a predetermined operation of a user terminal (not shown) by a user, and the file is transmitted from the Web server to the user terminal after all the data has been generated, and is reproduced by the user terminal.

In the embodiment, the moving image reproducer 100 functions through the operations of the image generation section 4d, the progress calculation section 4a, the determination section 4b, the progress correction section 4c, and the generation control section 4e under the control of the central control section 1, but this is not limitative. Specifically, the moving image reproducer 100 may function through execution of the predetermined programs by the CPU of the central control section 1.

Specifically, a program including a generation processing routine, a calculation processing routine, a determination processing routine, a correction processing routine, and a control processing routine is preliminarily stored in a program memory (not shown) for storing programs. Through the generation processing routine, the CPU of the central control section 1 may generate an interpolation frame image I interpolation between two adjacent frame images Fk and Fk+1 among a plurality of frame images F1 to Fn. In addition, through the calculation processing routine, the CPU of the central control section 1 may sequentially calculates the progress level of a predetermined musical piece between two adjacent frame images among the plurality of frame images F1 to Fn reproduced in synchronization with the predetermined timing of the musical piece played on the basis of the playing information T. In addition, through the determination processing routine, the CPU of the central control section 1 may determine whether the progress level corresponding to the reproduction timing of an interpolation frame image I varies along with the change in the tempo. In addition, through the correction processing routine, the CPU of the central control section 1 may generate the progress level being corrected such that if the progress level is determined to vary, the variation in the progress level is reduced. In addition, through the control processing routine, the CPU of the central control section 1 may generate an interpolation frame image I depending on the corrected progress level.

In addition, a recording medium for executing the above-mentioned processes is not limited to a ROM, a hard disk, or the like. For example, a removable media such as a non-volatile semiconductor memory like a flash memory or a CD-ROM can also be applied. Moreover, as a media for providing data of programs through a predetermined communication line, career waves can be applied.

The above-mentioned embodiments of the present invention disclosed herewith are merely an example and does not limit the present invention in all respects. The present invention includes all changes within the scope of the claims and its equivalents.

The entire disclosure of Japanese Patent Application No. 2011-125633 filed on Jun. 3, 2011 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A moving image reproducer comprising:
a non-transitory storage section which stores a plurality of frame images; and
a processor which is operable as:
 a calculation section which sequentially calculates a progress level of a predetermined musical piece, which is provided with tempo information, between two adjacent frame images among the plurality of frame images reproduced in synchronization with the predetermined musical piece;
 a generation section which sequentially generates, based on the progress level of the predetermined musical piece between the two adjacent frame images calculated by the calculation section, interpolation frame images each of which interpolates between two adjacent frame images among the plurality of frame images;
 a determination section which determines whether the progress level has varied along with a change in a tempo of the predetermined musical piece defined in the tempo information; and
 a control section which, when the determination section determines that the progress level has varied along with the change in the tempo, controls the generation section to newly generate an interpolation frame image so that the newly generated interpolation frame image corresponds to the progress level having varied along with the change in the tempo.

2. The moving image reproducer according to claim 1, wherein the processor is further operable as a correction section which corrects the progress level so as to reduce a variation in the progress level along with the change in the tempo when the determination section determines that the progress level has varied; and
wherein the correction section corrects the progress level in such a way that the progress level is an average between the progress level calculated before the change of the tempo and the progress level calculated after the change of the tempo.

3. A method of reproducing a moving image with a moving image reproducer, the method comprising:
sequentially calculating a progress level of a predetermined musical piece, which is provided with tempo information, between two adjacent frame images among a plurality of frame images stored in a storage section and reproduced in synchronization with the predetermined musical piece;
sequentially generating, based on the calculated progress level of the predetermined musical piece between the two adjacent frame images, interpolation frame images each of which interpolates between two adjacent frame images among the plurality of frame images;
determining whether the progress level has varied along with a change in a tempo of the predetermined musical piece defined in the tempo information; and
when it is determined that the progress level has varied along with the change in the tempo, newly generating an interpolation frame image so that the newly generated interpolation frame image corresponds to the progress level having varied along with the change in the tempo.

4. A non-transitory computer-readable recording medium having a program stored thereon, the program being executable by a computer to control the computer to function as:
a calculation section which sequentially calculates a progress level of a predetermined musical piece, which is provided with tempo information, between two adjacent frame images among a plurality of frame images stored in a storage section and reproduced in synchronization with the predetermined musical piece;
a generation section which sequentially generates, based on the progress level of the predetermined musical piece between the two adjacent frame images calculated by the calculation section, interpolation frame images each of which interpolates between two adjacent frame images among the plurality of frame images;
a determination section which determines whether the progress level has varied along with a change in a tempo of the predetermined musical piece defined in the tempo information; and
a control section which, when the determination section determines that the progress level has varied along with the change in the tempo, controls the generation section to newly generate an interpolation frame image so that the newly generated interpolation frame image corresponds to the progress level having varied along with the change in the tempo.

5. The moving image reproducer according to claim 1, wherein the processor is further operable as a reproduction section which reproduces the plurality of frame images with the generated interpolation frame images between the plurality of frame images.

6. The moving image reproducer according to claim 5, wherein the functions of (i) the calculation section, (ii) the determination section, (iii) the control section, and (iv) the control section are executed by the processor while the functions of the reproduction section are executed by the processor.

* * * * *